(12) United States Patent
Li et al.

(10) Patent No.: US 11,855,756 B2
(45) Date of Patent: Dec. 26, 2023

(54) STATUS CONTROL METHOD, DATA SENDING METHOD, AND TERMINAL

(71) Applicant: Huawei Technologies Co., Ltd., Shenzhen (CN)

(72) Inventors: Shengping Li, Wuhan (CN); Lei Jing, Wuhan (CN); Jun Zhou, Boulogne Billancourt (FR); Xuming Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 17/707,534

(22) Filed: Mar. 29, 2022

(65) Prior Publication Data

US 2022/0224429 A1 Jul. 14, 2022

Related U.S. Application Data

(63) Continuation of application No. PCT/CN2020/111120, filed on Aug. 25, 2020.

(30) Foreign Application Priority Data

Sep. 29, 2019 (CN) .......................... 201910939517.X

(51) Int. Cl.
*H04B 10/00* (2013.01)
*H04J 3/06* (2006.01)
(Continued)

(52) U.S. Cl.
CPC ............ *H04J 3/0638* (2013.01); *H04J 14/02* (2013.01)

(58) Field of Classification Search
CPC ........ H04J 14/08; H04J 14/086; H04B 10/272
See application file for complete search history.

(56) References Cited

U.S. PATENT DOCUMENTS 7,482,841 B1 1/2009 Nguyen et al.
7,653,312 B2 1/2010 Mori
(Continued)

FOREIGN PATENT DOCUMENTS

CN 102088327 A 6/2011
CN 102223198 A 10/2011
(Continued)

OTHER PUBLICATIONS

Zeng et al.,"Flexible-Rate 50G-PON Supporting 50, 37.5 and 25 GB/s Date Rates," IEEE p802.3ca Task Force meeting, Chicago, IL, effenberger_3ca_0318, total 9 pages (Mar. 2018).

*Primary Examiner* — Daniel G Dobson
(74) *Attorney, Agent, or Firm* — Leydig, Voit & Mayer, Ltd.

(57) ABSTRACT

A status control method, applied to an optical network unit (ONU) or an optical network terminal (ONT) of a passive optical network (PON) includes: receiving a first downlink data frame, where the first downlink data frame includes data of N different rates and indication information, the indication information includes length information of data of each rate in the first downlink data frame, and N≥2; determining length information of first data in the data of the N different rates, where a rate of the first data is higher than a working rate of a clock and data recovery (CDR) module; and generating control information based on the length information of the first data, to control the CDR module to be in a specified state within a period of time corresponding to the length information of the first data.

12 Claims, 12 Drawing Sheets

(51) Int. Cl.
*H04J 14/02* (2006.01)
*H04J 14/00* (2006.01)

(56) References Cited

U.S. PATENT DOCUMENTS

| | | | |
|---|---|---|---|
| 2006/0133809 | A1 | 6/2006 | Chow et al. |
| 2008/0056721 | A1 | 3/2008 | Mori |
| 2008/0187317 | A1 | 8/2008 | Yamabana |
| 2018/0041278 | A1* | 2/2018 | Funada ................ H04L 12/287 |
| 2018/0077475 | A1* | 3/2018 | Ye .......................... H04J 14/00 |

FOREIGN PATENT DOCUMENTS

| | | |
|---|---|---|
| CN | 102547491 A | 7/2012 |
| CN | 103152103 A | 6/2013 |
| CN | 106576010 B | 4/2019 |
| CN | 109756292 A | 5/2019 |
| JP | 2007243796 A | 9/2007 |
| WO | 2007141100 A1 | 12/2007 |
| WO | 2009110967 A1 | 9/2009 |

* cited by examiner

STATUS CONTROL METHOD, DATA SENDING METHOD, AND TERMINAL

CROSS-REFERENCE TO RELATED APPLICATIONS

This application is a continuation of International Application No. PCT/CN2020/111120, filed on Aug. 25, 2020, which claims priority to Chinese Patent Application No. 201910939517.X, filed on Sep. 29, 2019. The disclosures of the aforementioned applications are hereby incorporated by reference in their entireties.

TECHNICAL FIELD

This application relates to the field of communications technologies, and specifically, to a status control method, a data sending method, and a terminal.

BACKGROUND

A passive optical network (PON) includes an optical line terminal (OLT) on a central office side, an optical network unit (ONU) or an optical network terminal (ONT) on a user side, and an optical distribution network (ODN). The OLT provides a network side interface to a PON system, and is connected to one or more ODNs. The ONU provides a user side interface to the PON system, and is connected to the ODN. The ODN is a network including an optical fiber and a passive optical splitter, and is used to connect the OLT and the ONU (the ONT and the ONU are collectively represented by the ONU hereinafter) to distribute or reuse a data signal between the OLT and the ONU. In the PON, a direction from the OLT to the ONU is referred to as downstream; and a direction from the ONU to the OLT is referred to as upstream.

In the PON, downlink data of different rates is sent in a wavelength division multiplexing mode, and each data stream includes data of only one rate. In this case, data is sent by using a reference clock (clk) on an OLT side, and a clock and data recovery (CDR) module on an ONU side recovers the clock from a data stream for downlink data recovery, and determines an uplink data sending clock based on the recovered clock.

In the PON, if a time division multiplexing mode is used to send data of different rates in one data stream, a CDR module in an ONU may be unable to recover a clock of data of each rate. As a result, a clock on the ONU side is unstable, and an uplink transmit clock may be lost.

SUMMARY

Embodiments of this application provide a status control method, to control a CDR module to be in a specified state within a period of time in which a rate is higher than a working rate of the CDR module, thereby preventing a clock on an ONU side from being unstable.

A first aspect of this application provides a status control method. The method may be applied to an optical network unit (ONU) or an optical network terminal (ONT) on a user side in a passive optical network (PON), and the method may include:

receiving a first downlink data frame, where the first downlink data frame includes data of N different rates and indication information, the indication information includes length information of data of each rate in the first downlink data frame, the length information corresponds to a period of time for transmitting the data of each rate, and N≥2;

determining length information of first data in the data of the N different rates, where a rate of the first data is higher than a working rate of a clock and data recovery (CDR) module; and generating control information based on the length information of the first data, where the control information is used to control the CDR module to be in a specified state within a period of time corresponding to the length information of the first data, and the specified state includes a state of the CDR module at the start of the period of time or a local reference clock of the CDR module.

In the first aspect, the first downlink data frame is delivered by an optical line terminal (OLT) on a central office side in a time division multiplexing mode, and the first downlink data frame includes data of at least two rates. Data of different rates is usually arranged in ascending order of the rates. The indication information may include a quantity of different rates, for example, a value of N. The length information may be information representing a time length, or may be information representing a byte length. The CDR module may be configured to trace a phase of data, that is, align a clock of the CDR module with a clock of the traced data as much as possible. The CDR module has the local reference clock. The control information may be transmitted by a control chip to the CDR module in a form of a control signal, and the control information includes information about the period of time for transmitting the first data. In this way, the CDR module can remain in the specified state instead of tracing the first data within the period of time. If the length information of the first data is information representing a byte length, the information about the byte length may be first converted into information about a time length. Because a speed of light is constant, time required for transmitting the data at the speed of light can be determined based on the byte length. It will be appreciated from the first aspect that the CDR module may be controlled to be in the specified state within a period of time in which a rate is higher than the working rate of the CDR module, thereby preventing a clock on an ONU side from being unstable, and also preventing an uplink sending clock from being lost.

In an exemplary implementation of the first aspect, the data of each rate includes the length information of the data of the rate in the first downlink data frame. The foregoing step of determining length information of first data in the data of the N different rates may include:

determining the length information of the first data in the data of the N different rates from the data of all the rates.

In this exemplary implementation, the data of each rate includes the length information of the data of the rate, for example, information used to indicate a byte length or information used to indicate a time length.

In an exemplary implementation of the first aspect, the indication information is carried in data of a lowest rate in the N different rates. The foregoing step of determining length information of first data in the data of the N different rates may include: determining the length information of the first data in the data of the N different rates from the data of the lowest rate.

In this exemplary implementation, the length information of the data of each rate is carried in the data of the lowest rate. In this way, it can be ensured that the ONU or the ONT can obtain the length information of the data of each rate through parsing.

In an exemplary implementation of the first aspect, the length information in the data of each rate includes information of the data of the rate in the first downlink data frame and a gap (gap) byte, where the information is used to indicate a byte length, and the gap byte is used by the CDR module to switch from a current state to the local reference clock within duration of the gap byte. The foregoing step of determining the length information of the first data in the data of the N different rates from the data of all the rates may include:

determining, from the data of all the rates, a byte length and a gap byte in data of a rate that is not higher than the working rate of the CDR module; and determining a byte length and a gap byte of the first data based on the byte length and the gap byte in the data of the rate that is not higher than the working rate of the CDR module and a total byte length of the first downlink data frame; and correspondingly, the generating control information based on the length information of the first data may include:

determining, based on an offset of the byte length and an offset of the gap byte of the first data that are relative to a reference point in the total byte length of the first downlink data frame and a time length of the first downlink data frame, the period of time for transmitting the first data, where the reference point is a start location of a physical synchronization sequence.

In this exemplary implementation, the length information of the data of each rate is represented by using the information used to indicate the byte length and the gap byte. The information used to indicate the byte length may be several bits, and thousands of bytes may be represented by using several bits. The gap byte may be 1010 or the like, and the gap byte corresponds to a period of time, for example, one microsecond. The CDR module may switch from the current state to the local reference clock of the CDR module by using the one microsecond. The description "a rate that is not higher than" includes "the rate that is lower than the working rate" and "the rate that is equal to the working rate". The data of the rate that is not higher than the working rate may be obtained through parsing, and one downlink data frame has fixed duration and therefore also has a fixed total quantity of bytes. In this way, the byte length and the gap byte of the first data of the rate higher than the working rate can be calculated based on a total quantity of bytes and the byte length and the gap byte of the data of the rate that is not higher than the working rate. Gap bytes in the data of all the rates are basically the same. The first data may be data of one rate, or may be data of two or more rates. Regardless of a quantity of rates of the first data, all rates of the data are higher than the working rate of the CDR module. Because the data of all the rates is usually sorted in ascending order of the rates, even when there are a plurality of pieces of data of rates higher than the working rate, a total period of time of the plurality of pieces of data of the rates higher than the working rate can be directly determined, to control the CDR module to remain in the specified state within the total duration.

In an exemplary implementation of the first aspect, the indication information includes a start time offset and an end time offset of the data of each rate relative to a reference point, and the reference point is a time point of a start location of a physical synchronization sequence.

The foregoing step of determining the length information of the first data in the data of the N different rates from the data of the lowest rate may include: determining a start time offset and an end time offset of the first data from the data of the lowest rate; and correspondingly, the generating control information based on the length information of the first data includes:

determining, based on the time point of the start location of the physical synchronization sequence and the start time offset and the end time offset of the first data, a start time point and an end time point for transmitting the first data.

In this exemplary implementation, a transmission time offset of the data of each rate is indicated by using the start time offset and the end time offset. For example, there are data of three rates: data 1, data 2, and data 3 in ascending order of the rates, and the indication information includes a start time offset and an end time offset of the data 1, a start time offset and an end time offset of the data 2, and a start time offset and an end time offset of the data 3. Both the start time offset and the end time offset are offset information relative to the reference point, and the time point of the start location of the physical synchronization sequence is used as the reference point. In this way, the start time offset and the end time offset of the data of each rate can be determined, and then the start time and the end time for transmitting the first data can be determined.

In an exemplary implementation of the first aspect, the first downlink data frame and a second downlink data frame are equal in time length and are two adjacent data frames, a time interval between data of a first rate in the first downlink data frame and data of the first rate in the second downlink data frame is equal to the time length of the first downlink data frame, and when N takes different values, the time length of the first downlink data frame remains unchanged.

In this exemplary implementation, all downlink data frames have a same time length, for example, each are 125 microseconds. Regardless of whether there are two or more pieces of data of different rates, the time length remains unchanged. All pieces of data may occupy different duration in one downlink data frame, but a time interval between data of a same rate in two adjacent downlink data frames remains unchanged and is equal to a time length of one downlink data frame. In a frame design of this structure, data of different rates can be distributed to different user terminals by using a fixed time interval, thereby helping improve data distribution efficiency.

A second aspect of this application provides a data sending method. The method may be applied to an OLT in a PON, and the method may include:

obtaining to-be-sent data of N different rates, where N≥2;

configuring the data of the N different rates as a first downlink data frame, where the first downlink data frame includes the data of the N different rates and indication information, the indication information includes arrangement length information of data of each rate in the first downlink data frame, and the length information corresponds to a period of time for transmitting the data of each rate; and sending the first downlink data frame.

In the second aspect, the OLT delivers the first downlink data frame in a time division multiplexing mode, and the first downlink data frame includes data of at least two rates. Data of different rates is usually arranged in ascending order of the rates. The indication information may include a quantity of different rates, for example, a value of N. The length information may be information representing a time length, or may be information representing a byte length. The length information may be used by an ONU or an ONT to generate control information, to control a CDR module to remain in a specified state instead of tracing, within a period of time indicated by the control information, first data of a rate higher than a working rate of the CDR module. In this way, a clock on an ONU or ONT side can be prevented from being unstable, and an uplink transmit clock on the ONU or ONT side can also be prevented from being lost.

In an exemplary implementation of the second aspect, the indication information is carried in the data of each rate.

In this exemplary implementation, the data of each rate includes the length information of the data of the rate, for example, information used to indicate a byte length or information used to indicate a time length.

In an exemplary implementation of the second aspect, the indication information is carried in data of a lowest rate in the N different rates.

In this exemplary implementation, the length information of the data of each rate is carried in the data of the lowest rate. In this way, it can be ensured that the ONU or the ONT can obtain the length information of the data of each rate through parsing.

In an exemplary implementation of the second aspect, the length information in the data of each rate includes information of the data of the rate in the first downlink data frame and a gap byte, where the information is used to indicate a byte length, and the gap byte is used by the CDR module to switch from a current state to a local reference clock within duration of the gap byte.

In this exemplary implementation, the length information of the data of each rate is represented by using the information used to indicate the byte length and the gap byte. The information used to indicate the byte length may be several bits, and thousands of bytes may be represented by using several bits. The gap byte may be 1010 or the like, and the gap byte corresponds to a period of time, for example, one microsecond. The CDR module may switch from the current state to the local reference clock of the CDR module by using the one microsecond.

In an exemplary implementation of the second aspect, the indication information includes a start time offset and an end time offset of the data of each rate relative to a reference point, and the reference point is a time point of a start location of a physical synchronization sequence.

In this exemplary implementation, a transmission time offset of the data of each rate is indicated by using the start time offset and the end time offset. For example, there are data of three rates: data 1, data 2, and data 3 in ascending order of the rates, and the indication information includes a start time offset and an end time offset of the data 1, a start time offset and an end time offset of the data 2, and a start time offset and an end time offset of the data 3. Both the start time offset and the end time offset are offset information relative to the reference point, and the time point of the start location of the physical synchronization sequence is used as the reference point. In this way, the ONU or the ONT can determine the start time offset and the end time offset of the data of each rate, and then can determine a start time point and an end time point for transmitting the first data.

In an exemplary implementation of the second aspect, the first downlink data frame and a second downlink data frame are equal in time length and are two adjacent data frames, a time interval between data of a first rate in the first downlink data frame and data of the first rate in the second downlink data frame is equal to a time length of the first downlink data frame, and when N takes different values, the time length of the first downlink data frame remains unchanged.

In this exemplary implementation, all downlink data frames have a same time length, for example, each are 125 microseconds. Regardless of whether there are two or more pieces of data of different rates, the time length remains unchanged. All pieces of data may occupy different duration in one downlink data frame, but a time interval between data of a same rate in two adjacent downlink data frames remains unchanged and is equal to a time length of one downlink data frame. In a frame design of this structure, the ONU or the ONT can distribute data of different rates to different user terminals by using a fixed time interval, thereby helping improve data distribution efficiency.

A third aspect of this application provides an optical network terminal. The optical network terminal has functions of implementing the method according to any one of the first aspect or the possible implementations of the first aspect. The functions may be implemented by hardware, or may be implemented by hardware executing corresponding software. The hardware or software includes one or more modules corresponding to the functions, for example, a receiving unit, a processing unit, and a sending unit.

A fourth aspect of this application provides an optical line terminal. The optical line terminal has functions of implementing the method according to any one of the second aspect or the possible implementations of the second aspect. The functions may be implemented by hardware, or may be implemented by hardware executing corresponding software. The hardware or software includes one or more modules corresponding to the functions, for example, a receiving unit, a processing unit, and a sending unit.

A fifth aspect of this application provides an optical network terminal. The optical network terminal includes a transceiver, a clock and data recovery (CDR) module, at least one processor, a memory, and computer-executable instructions that are stored in the memory and that can be run in the processor. When the computer-executable instructions are executed by the processor, the processor performs the method according to any one of the first aspect or the possible implementations of the first aspect.

A sixth aspect of this application provides an optical line terminal. The optical line terminal includes a transceiver, at least one processor, a memory, and computer-executable instructions that are stored in the memory and that can be run in the processor. When the computer-executable instructions are executed by the processor, the processor performs the method according to any one of the second aspect or the possible implementations of the second aspect.

A seventh aspect of this application provides a computer-readable storage medium storing one or more computer-executable instructions. When the computer-executable instructions are executed by a processor, the processor performs the method according to any one of the first aspect or the possible implementations of the first aspect.

An eighth aspect of this application provides a computer-readable storage medium storing one or more computer-executable instructions. When the computer-executable instructions are executed by a processor, the processor performs the method according to any one of the first aspect or the possible implementations of the first aspect.

A ninth aspect of this application provides a computer program product (or referred to as a computer program) storing one or more computer-executable instructions. When the computer-executable instructions are executed by a processor, the processor performs the method according to any one of the first aspect or the possible implementations of the first aspect.

A tenth aspect of this application provides a computer program product storing one or more computer-executable instructions, where when the computer-executable instructions are executed by a processor, the processor performs the method according to any one of the second aspect or the possible implementations of the second aspect.

An eleventh aspect of this application provides a chip system. The chip system includes a processor, configured to support an optical network terminal to implement functions in any one of the first aspect or the possible implementations of the first aspect. In an exemplary embodiment, the chip system may further include a memory. The memory is configured to store program instructions and data for the optical network terminal. The chip system may include a chip, or may include a chip and another discrete component.

A twelfth aspect of this application provides a chip system. The chip system includes a processor, configured to support an optical line terminal to implement functions in any one of the second aspect or the possible implementations of the second aspect. In an exemplary embodiment, the chip system further includes a memory. The memory is configured to store program instructions and data of the optical line terminal. The chip system may include a chip, or may include a chip and another discrete component.

For technical effects brought by any one of the third aspect, the fifth aspect, the seventh aspect, the ninth aspect, and the eleventh aspect or the possible implementations thereof, refer to technical effects brought by the first aspect or the different possible implementations of the first aspect. Details are not described herein again.

For technical effects brought by any one of the fourth aspect, the sixth aspect, the eighth aspect, the tenth aspect, and the twelfth aspect or the possible implementations thereof, refer to technical effects brought by the second aspect or the different possible implementations of the second aspect. Details are not described herein again.

In embodiments of this application, for a downlink data frame that includes data of a plurality of rates, the CDR module may be controlled to be in the specified state within a period of time in which a rate is higher than the working rate of the CDR module, thereby preventing a clock on an ONU side from being unstable, and also preventing an uplink sending clock from being lost.

DESCRIPTION OF EMBODIMENTS

The following describes embodiments of this application with reference to the accompanying drawings. The described embodiments are merely some but not all of the embodiments of this application. A person of ordinary skill in the art will appreciate that technical solutions provided in embodiments of this application are also applicable to similar technical problems with development of technologies and emergence of new scenarios.

In the specification, claims, and accompanying drawings of this application, terms such as "first" and "second" are intended to distinguish between similar objects, but do not necessarily indicate a specific order or sequence. It should be understood that data used in such a way is interchangeable in proper circumstances, so that embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Embodiments of this application provide a status control method, to control a CDR module to be in a specified state within a period of time in which a rate is higher than a working rate of the CDR module, thereby preventing a clock on an ONU side from being unstable. Details are respectively described in the following.

Figure 1:
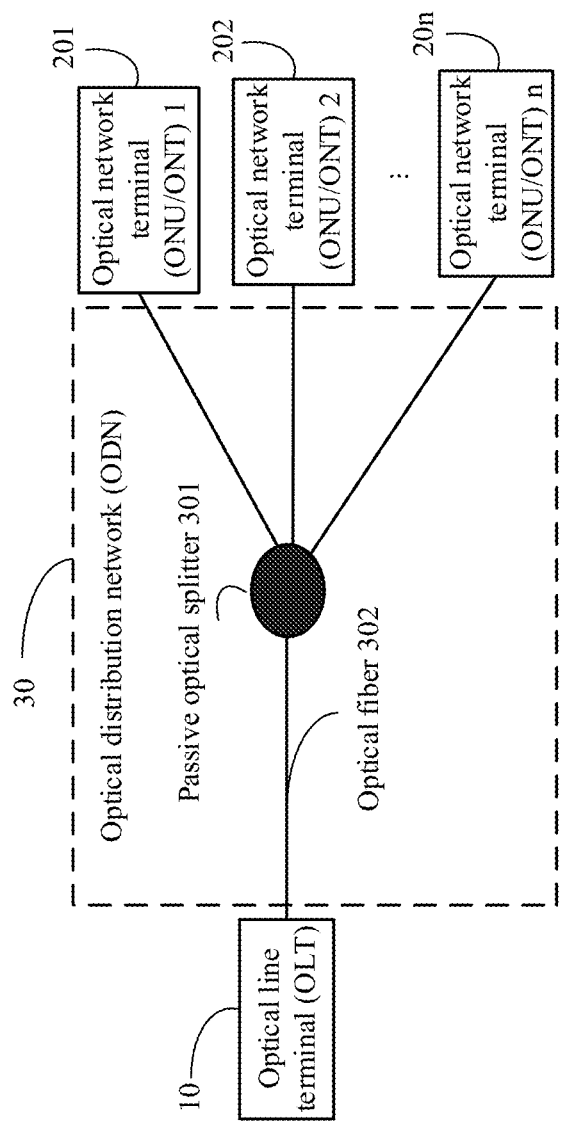
FIG. 1 is a schematic diagram of an embodiment of a chip system according to an embodiment of this application.

FIG. 1 is a schematic diagram of an embodiment of a passive optical network (PON) system according to an embodiment of this application.

As shown in FIG. 1, the PON system includes an optical line terminal (OLT) 10, optical network terminals (an optical network unit (ONU)/optical network terminal (ONT) 1 to an ONU/ONT n) 201 to 20*n*, and an optical distribution network (ODN) 30. The OLT 10 provides a network side interface to a PON system, and is connected to one or more ODNs 30. The (ONU/ONT 1) 201 to the (ONU/ONT n) 20*n* provide a user side interface for the PON system, and are connected to the ODN 30. The ODN 30 is a network including a passive optical splitter 301 and an optical fiber 302, and is used to connect the OLT 10 and the (ONU/ONT 1) 201 to the (ONU/ONT n) 20n. In the PON, a direction from the OLT to the (ONU/ONT) is referred to as downstream, and a direction from the (ONU/ONT) to the OLT is referred to as upstream.

Figure 2:
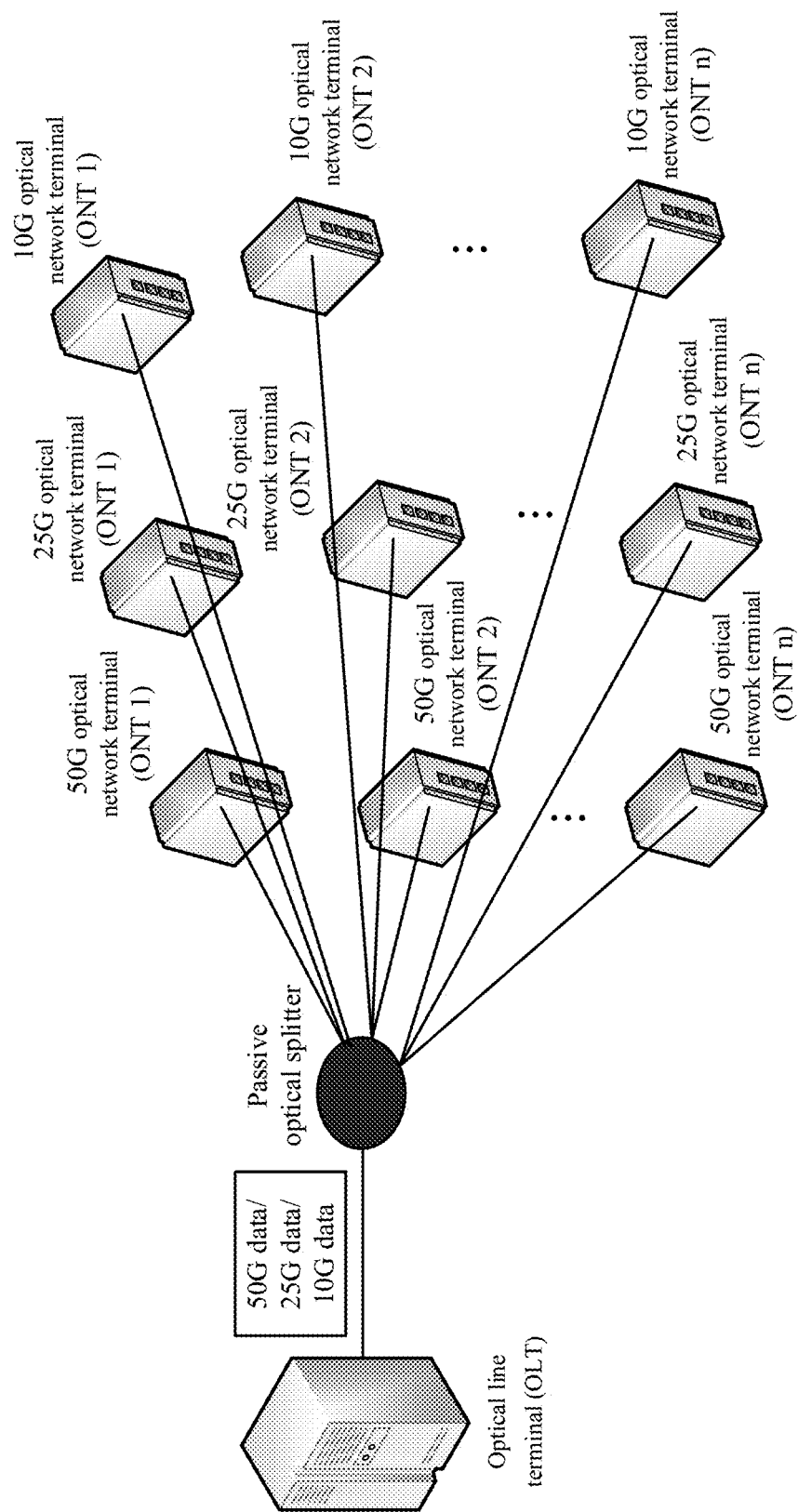
FIG. 2 is a schematic diagram of an embodiment of a time division multiplexing PON system according to an embodiment of this application.

FIG. 2 is a schematic diagram of an embodiment of a time division multiplexing PON system according to an embodiment of this application.

As shown in FIG. 2, for understanding of the time division multiplexing PON system provided in this embodiment of this application, refer to the PON system described in FIG. 1. A difference lies in that the time division multiplexing system transmits data of a plurality of different rates, for example, data of a 10 G rate, data of a 25 G rate, and data of a 50 G rate that are shown in FIG. 2, by using one downlink data frame. ONTs also include an ONT 1 to an ONT n of the 10 G rate, an ONT 1 to an ONT n of the 25 G rate, and an ONT 1 to an ONT n of the 50 G rate. An ONT of the 10 G rate indicates that a maximum rate parsing capability designed for the ONT is 10 G, and the ONT of the 10 G rate can parse data of a rate of 10 G or below 10 G. An ONT of the 25 G rate indicates that a maximum rate parsing capability designed for the ONT is 25 G, and the ONT of the 25 G rate can parse data of a rate of 25 G or below 25 G. An ONT of the 50 G rate indicates that a maximum rate parsing capability designed for the ONT is 50 G, and the ONT of the 50 G rate can parse data of a rate of 50 G or below 50 G. The ONT of the 10 G rate can receive data of a rate higher than 10 G, but cannot parse the data of the rate higher than 10 G.

In the time division multiplexing PON system, an OLT delivers a downlink data frame in a time division multiplexing mode, and the downlink data frame includes data of a plurality of different rates. For example, in the scenario shown in FIG. 2, one downlink data frame may include data of three different rates: 10 G, 25 G, and 50 G. The downlink data frame is transmitted to ONUs/ONTs (the ONTs are used as an example in FIG. 2) by using a passive optical splitter and an optical fiber.

Figure 3:
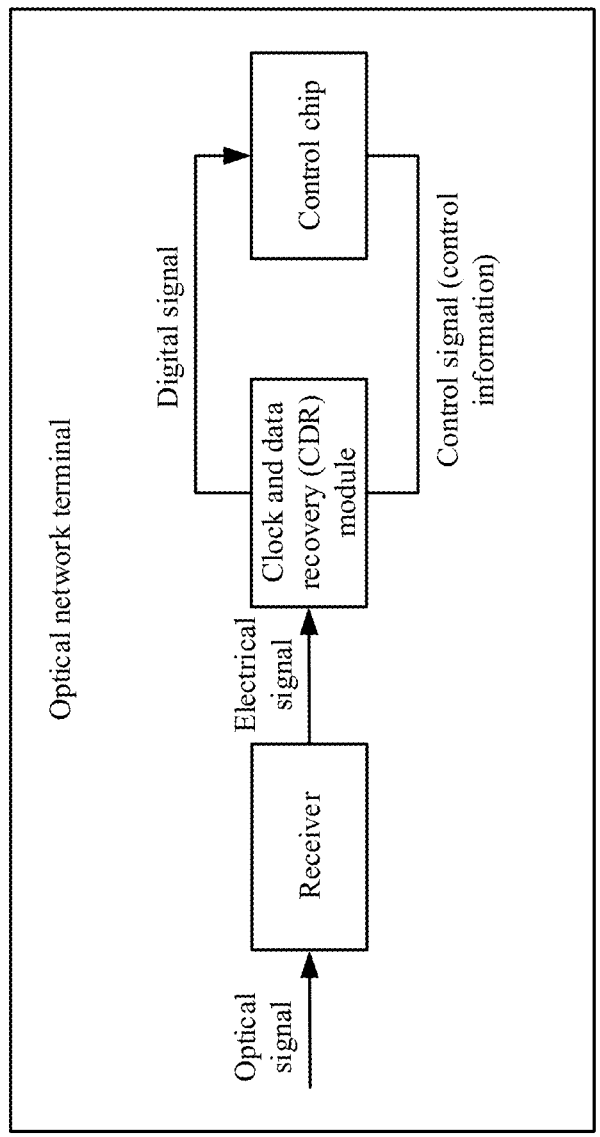
FIG. 3 is a schematic diagram depicting a structure of an ONU/ONT according to an embodiment of this application.

As shown in FIG. 3, an optical network terminal (ONU/ONT) may include a receiver, a clock and data recovery (CDR) module, and a control chip. The control chip may be a media access control (MAC) chip.

The receiver may receive a downlink data frame in a form of an optical signal, and then convert the optical signal into an electrical signal.

The CDR module converts a downlink data frame in a form of the electrical signal into a downlink data frame in a digital 0/1 form, and then transmits the downlink data frame in the digital form to the control chip.

The control chip may parse the downlink data frame, to determine a transmission period of time of data of a rate higher than a working rate of the CDR module from the downlink data frame, and then generate control information. The control information may be sent to the CDR module in a form of a control signal.

The CDR module remains, based on the control information, in a specified state within the transmission period of time of the data of the rate higher than the working rate of the CDR module. The specified state includes a state of the CDR module at the start of the period of time or a local reference clock of the CDR module. In this way, the CDR module does not need to trace a phase of the data of the rate higher than the working rate of the CDR module, thereby preventing a clock on an ONU side from being unstable, and also preventing an uplink sending clock from being lost.

A process in which the CDR module traces a phase of data may be understood as follows: The CDR module traces a phase of data of each rate when working, determines a phase difference based on the phase of the data and a phase of the CDR module, and adjusts a working clock of the CDR module based on the phase difference, until the phase of the CDR module is equal to the phase of traced data. The phase tracing process may also be understood as a clock alignment process. For any data of a rate lower than or equal to the working rate of the CDR module, the CDR module can align the clock of the CDR module with a clock of the traced data by using the phase adjustment process. For the data of the rate higher than the working rate of the CDR module, the CDR module cannot align the clock of the CDR module with a phase of the data of the high rate, and instead, the clock of the CDR module is unstable. Therefore, in a solution provided in this embodiment of this application, the data of the rate higher than the working rate of the CDR module is effectively prevented from being traced, and stability of the clock on the ONU side is ensured.

Figure 4:
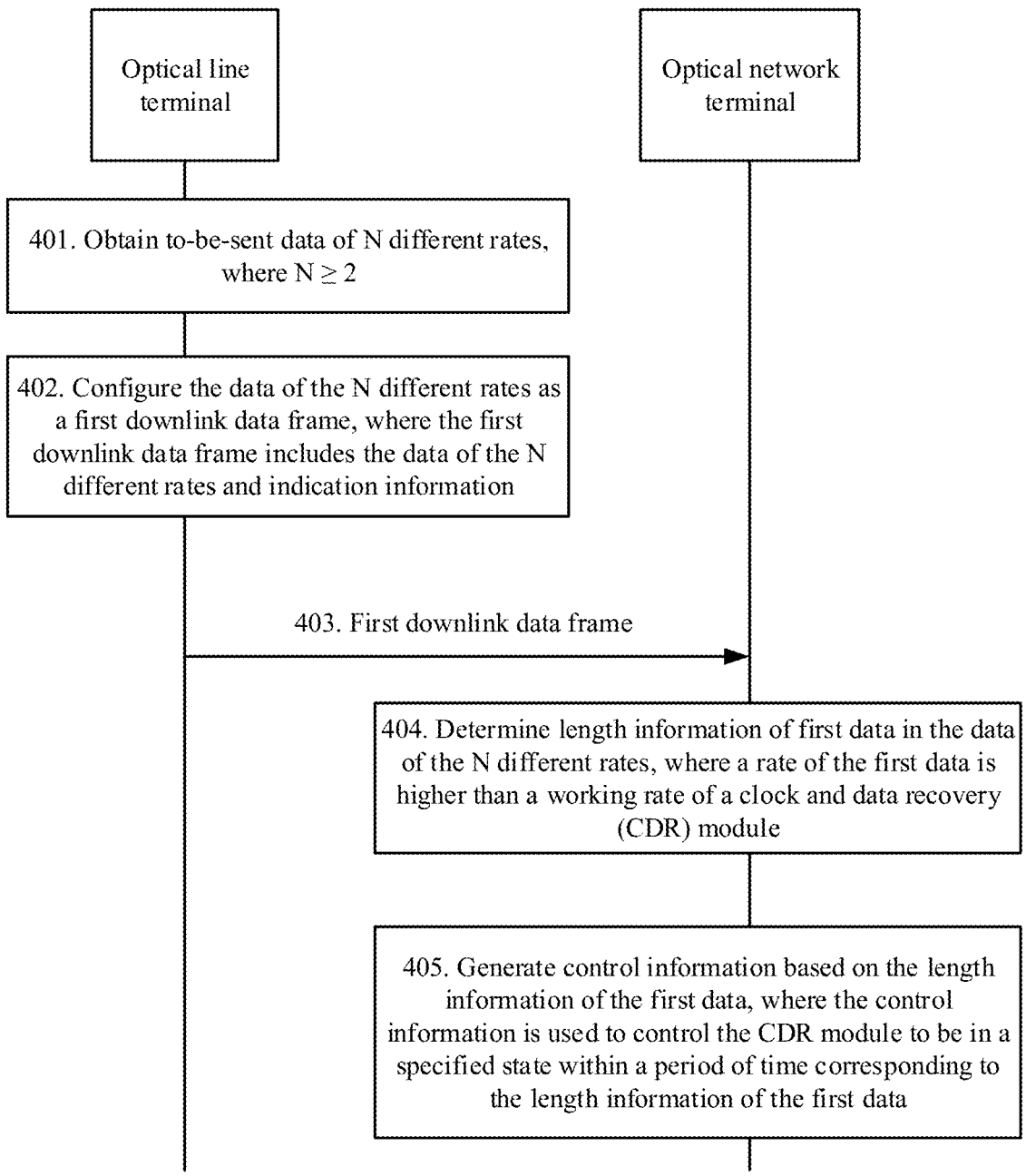
FIG. 4 is a schematic diagram of an embodiment of a status control method according to an embodiment of this application.

With reference to the foregoing time division multiplexing PON system and with reference to FIG. 4, an embodiment of the status control method provided in embodiments of this application may include the following steps:

401. An optical line terminal obtains to-be-sent data of N different rates, where N≥2.

402. The optical line terminal configures the data of the N different rates as a first downlink data frame, where the first downlink data frame includes the data of the N different rates and indication information.

The indication information includes arrangement length information of data of each rate in the first downlink data frame, and the length information corresponds to a period of time for transmitting the data of each rate.

The length information may be information used to indicate a time length, or may be information used to indicate a byte length.

If the length information is the information used to indicate the time length, the period of time for transmitting the data of each rate may be determined based on the information about the time length.

If the length information is the information representing the byte length, the information about the byte length may be first converted into the information about the time length. Because a speed of light is constant, time required for transmitting the data at the speed of light can be determined based on the byte length, to determine the period of time for transmitting the data of each rate.

403. The optical line terminal sends the first downlink data frame, and correspondingly an optical network terminal receives the first downlink data frame.

404. The optical network terminal determines length information of first data in the data of the N different rates, where a rate of the first data is higher than a working rate of a clock and data recovery (CDR) module.

For example, for a downlink data frame that includes three rates: 10 G, 25 G, and 50 G, if a maximum capability designed for the optical network terminal is 25 G, that is, a maximum working rate of the CDR module is 25 G, the first data is data of 50 G. If a maximum capability designed for the optical network terminal is 10 G, that is, a maximum working rate of the CDR module is 10 G, the first data is data of 25 G and data of 50 G.

405. The optical network terminal generates control information based on the length information of the first data, where the control information is used to control the CDR module to be in a specified state within a period of time corresponding to the length information of the first data.

The specified state includes a state of the CDR module at the start of the period of time or a local reference clock of the CDR module.

The control information includes information about the period of time for transmitting the first data. In this way, the CDR module can remain in the specified state instead of tracing the first data within the period of time.

The foregoing steps 401 to 403 may also be referred to as a data sending method from a perspective of the optical line terminal.

In a solution provided in this embodiment this application, the CDR module may be controlled to be in the specified state within a period of time in which a rate is higher than the working rate of the CDR module, thereby preventing a clock on an ONU side from being unstable and also preventing an uplink sending clock from being lost.

The downlink data frame provided in this embodiment of this application may be designed based on frame structures shown in FIG. 5A to FIG. 5D.

Figure 5A:
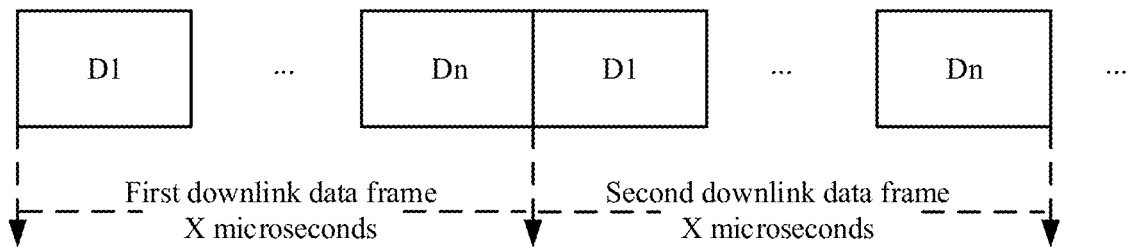
FIG. 5A is an example schematic diagram of a structure of a downlink data frame according to an embodiment of this application.
Figure 5B:
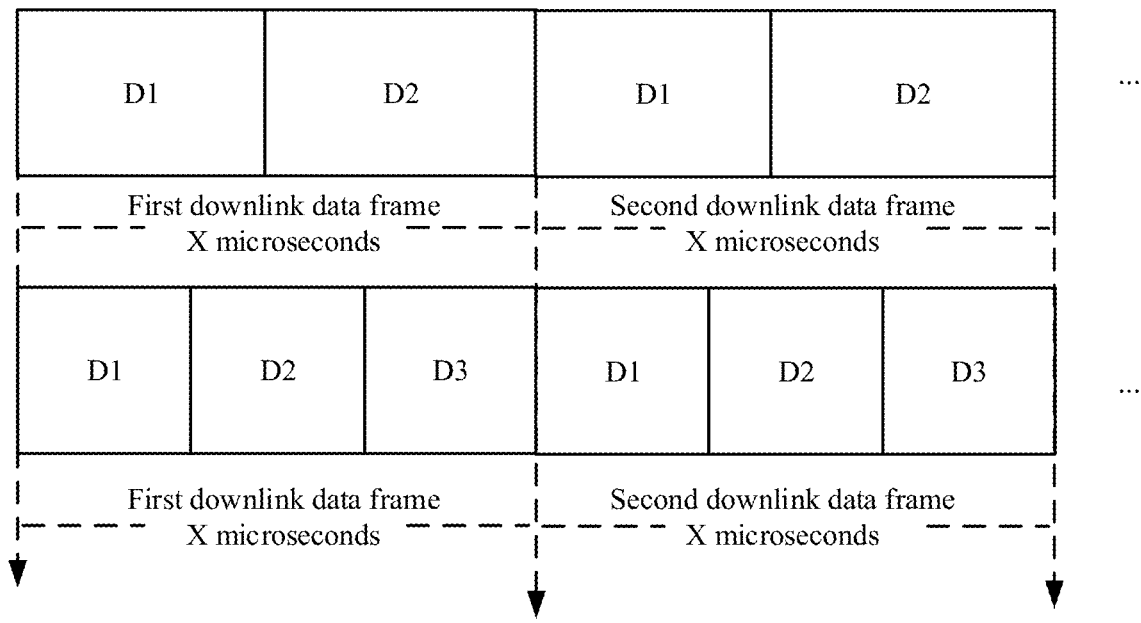
FIG. 5B is another example schematic diagram of a structure of a downlink data frame according to an embodiment of this application.
Figure 5C:
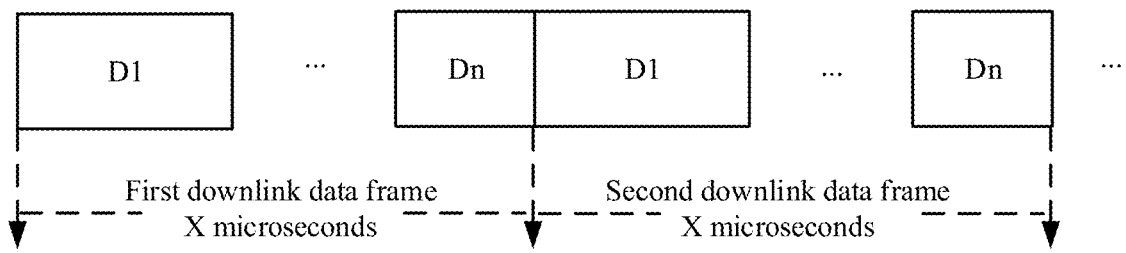
FIG. 5C is another example schematic diagram of a structure of a downlink data frame according to an embodiment of this application.
Figure 5D:
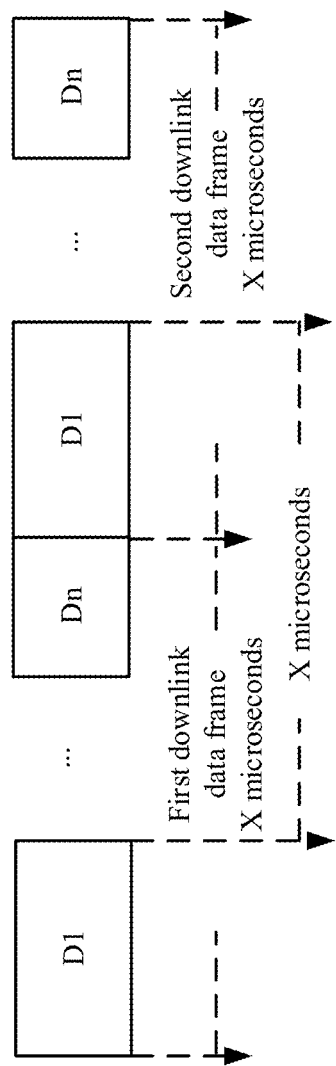
FIG. 5D is another example schematic diagram of a structure of a downlink data frame according to an embodiment of this application.

The first downlink data frame and a second downlink data frame are equal in time length and are two adjacent data frames. Time lengths of the first downlink data frame and the second downlink data frame that are shown in FIG. 5A are both X microseconds, and a value of X may be, for example, 125 microseconds. Certainly, the value of X may be alternatively another value. This is not limited in this application. It should be expressed herein that, all downlink data frames have a same time length. Each downlink data frame may include data of two or more different rates: D1 to Dn. Regardless of a quantity of different rates of the data, the time length of the downlink data frame remains unchanged and is X microseconds. For example, as shown in FIG. 5B, a time length of a downlink data frame including data of two different rates is the same as a time length of a downlink data frame including data of three different rates. It should be noted that data of different rates in D1 to Dn in a same downlink data frame may be not equal in time length. As shown in FIG. 5C, a time length of D1 may be not equal to a time length of Dn. A time interval between data of a same rate in the two adjacent data frames is equal to a time length of the first downlink data frame. As shown in FIG. 5D, a time interval between a start location of D1 in the first downlink data frame and a start location of D1 in the second downlink data frame is X microseconds, a time interval between an end location of D1 in the first downlink data frame and an end location of D1 in the second downlink data frame is X microseconds, and both the time intervals are equal to the time length of the downlink data frame.

The indication information in the first downlink data frame in this embodiment of this application may be carried in the data of each rate, or may be carried in data of a lowest rate in the N different rates. Regardless of a carrying manner, the indication information may be implemented by extending a payload length index (payload length index) field in a frame structure shown in FIG. 6A or FIG. 6B.

Figure 6A:
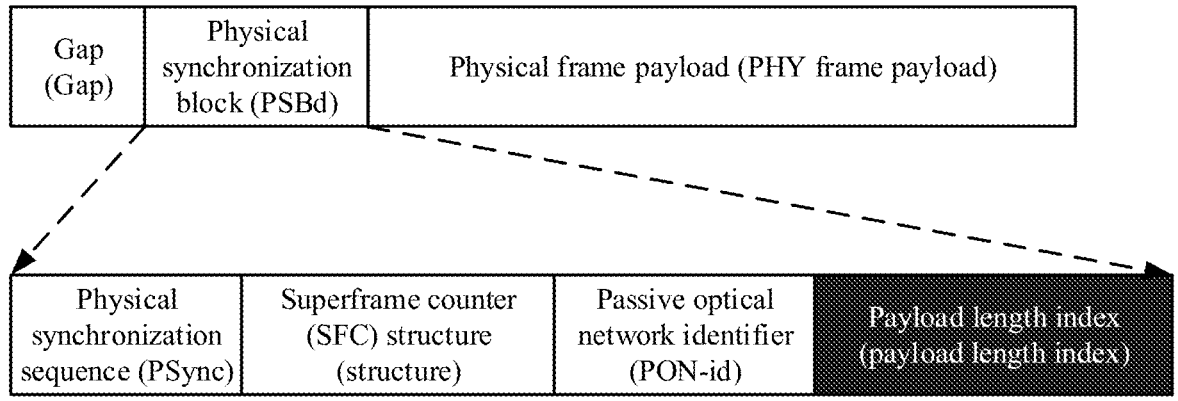
FIG. 6A is an example schematic diagram of a structure of each piece of data in a downlink data frame according to an embodiment of this application.

As shown in FIG. 6A, a payload length index field may be extended in a physical synchronization block (PSBd) of a frame structure. The PSBd includes a physical synchronization sequence (PSync), a superframe counter (SFC) structure, a passive optical network identifier (PON-id) structure, and an extended payload length index field.

The PSync is used by the optical network terminal to find a downlink data frame boundary. In this embodiment of this application, the indication information is set in the payload length index field, and the optical network terminal may determine the transmission period of time of each rate with reference to the PSync and with reference to the indication information in the payload length index field.

Figure 6B:
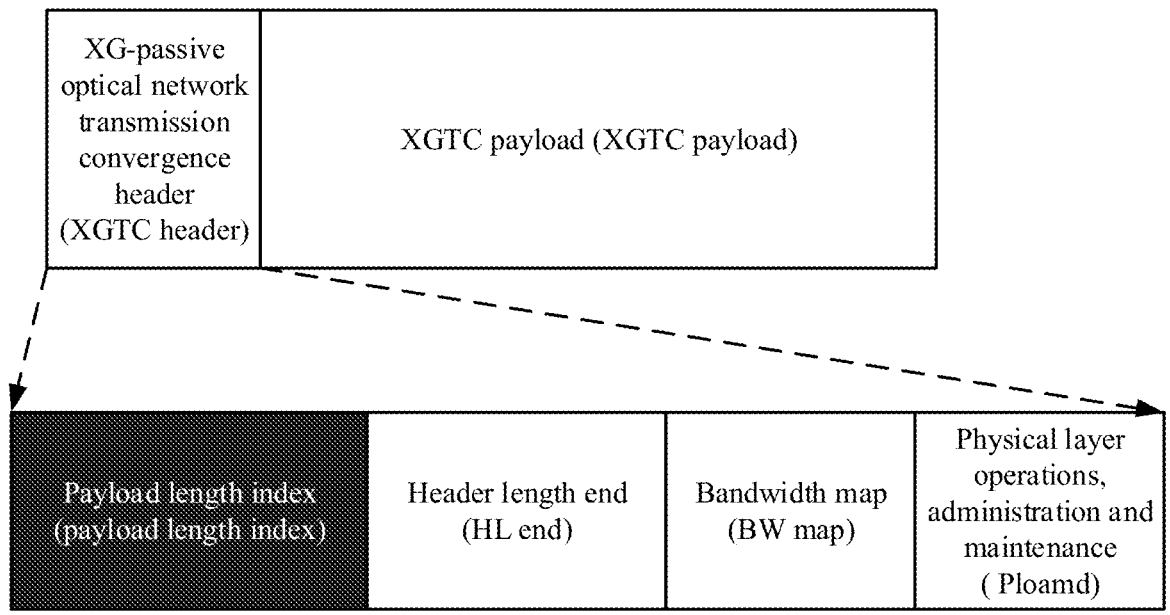
FIG. 6B is another example schematic diagram of a structure of each piece of data in a downlink data frame according to an embodiment of this application.

As shown in FIG. 6B, a payload length index field may be alternatively extended in an XG-passive optical network transmission convergence (XG-PON transmission convergence, XGTC) header. In addition, the header further includes a header length of downstream (HL) end field, a bandwidth map (BW map) field, and a physical layer operations, administration and maintenance (Ploamd) field.

When the data of each rate includes the length information of the data of the rate in the first downlink data frame, the length information of the first data in the data of the N different rates is determined from the data of all the rates. In this exemplary embodiment, the data of each rate includes the structure shown in FIG. 6A or FIG. 6B, and the length information of the data of each rate may be obtained from a payload length index field in the data of each rate, to determine the length information of the first data.

Figure 6C:
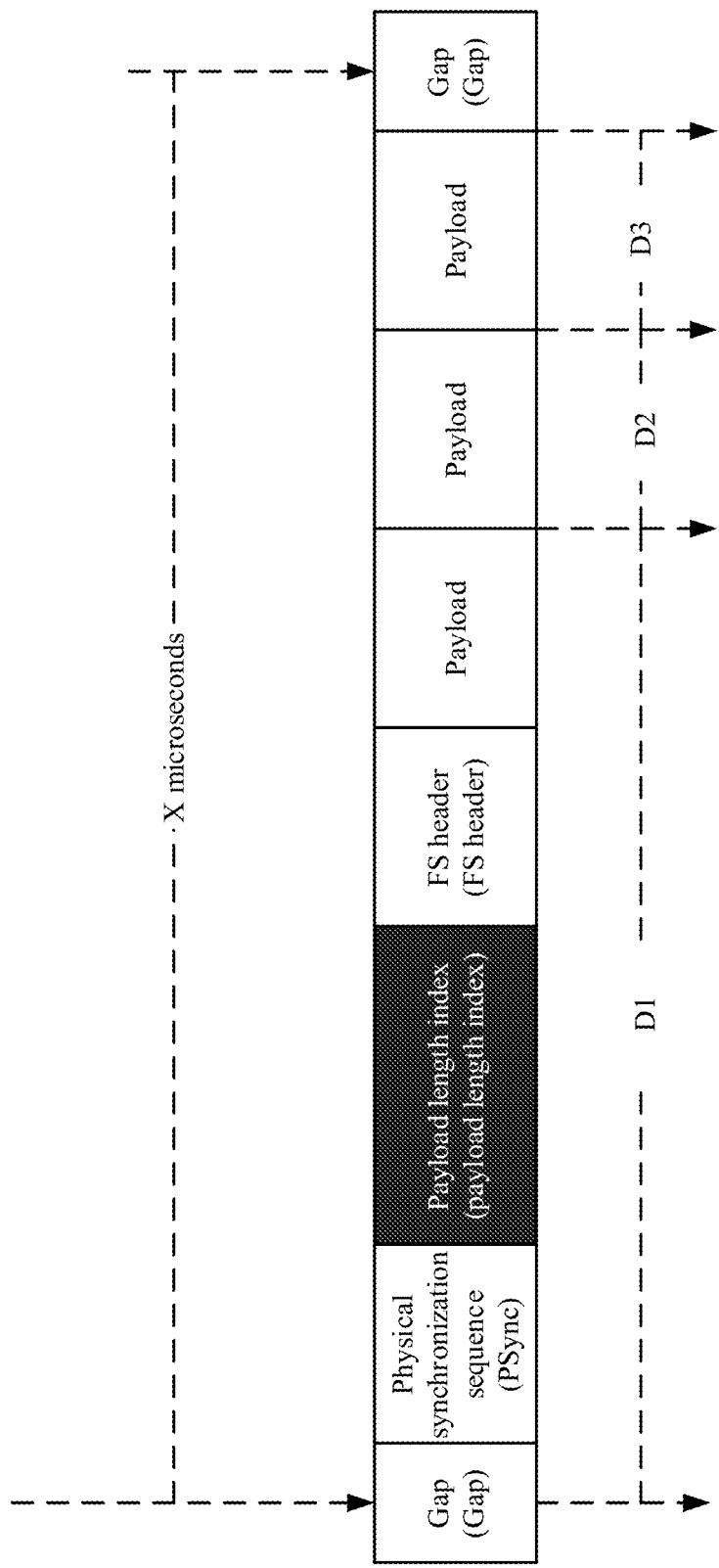
FIG. 6C is an example schematic diagram of a structure of a downlink data frame according to an embodiment of this application.

When the indication information is carried in the data of the lowest rate in the N different rates, the length information of the first data in the data of the N different rates is determined from the data of the lowest rate. In this exemplary embodiment, for a downlink data frame that includes a plurality of rates, the indication information is included in data of a lowest rate, and the indication information does not need to be included in data of another higher rate. For understanding of a structure of the downlink data frame, refer to FIG. 6C. As shown in FIG. 6C, a time length of a downlink data frame that includes data of three different rates is X microseconds, data D1 includes an extended payload length index field, and neither D2 nor D3 includes an extended payload length index field. The optical network terminal can determine the length information of the data of each rate by parsing only data of a lowest rate, to determine the length information of the first data.

In this embodiment of this application, the length information carried in the payload length index field may be represented by using the following two solutions:

1. The length information in the data of each rate includes information of the data of the rate in the first downlink data frame and a gap byte, where the information is used to indicate a byte length.

Figure 7A:
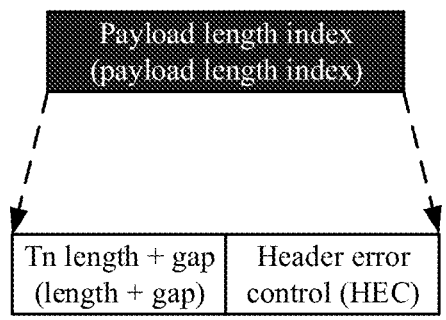
FIG. 7A is an example schematic diagram of indication information in a downlink data frame according to an embodiment of this application.

As shown in FIG. 7A, a payload length index field of data Dn is used as an example. The extended field includes information Tn length used to indicate a byte length of the data Dn and a gap byte. The extended field may further include header error control (HEC), and the HEC is used for error correction verification. Likewise, for a payload length index field of data D1, the extended field includes information T1 length used to indicate a byte length of the data D1 and a gap byte. The gap byte is used by the CDR module to switch from a current state to the local reference clock within duration of the gap byte.

The foregoing step of determining the length information of the first data in the data of the N different rates from the data of all the rates may include:

determining, from the data of all the rates, a byte length and a gap byte in data of a rate that is not higher than the working rate of the CDR module; and determining a byte length and a gap byte of the first data based on the byte length and the gap byte in the data of the rate that is not higher than the working rate of the CDR module and a total byte length of the first downlink data frame; and correspondingly, the generating control information based on the length information of the first data may include:

determining, based on an offset of the byte length and an offset of the gap byte of the first data that are relative to a reference point in the total byte length of the first downlink data frame and a time length of the first downlink data frame, the period of time for transmitting the first data, where the reference point is a start location of a physical synchronization sequence.

In this exemplary embodiment, the information used to indicate the byte length may be information of several bits, and the information of these bits may be used to represent thousands of bytes. For example, 4 bits are used to indicate Y bytes. A time length of one downlink data frame is fixed. For example, the time length of the downlink data frame is 125 microseconds. A total quantity of bytes of the downlink data frame may be 155520 bytes. A quantity of bits of each downlink data frame is also fixed. In this way, after the start location of the physical synchronization sequence is used as the reference point, an offset of the data of each rate relative to the reference point may be determined based on the information that is used to indicate the length of the data of the rate in the data of the rate, and then byte lengths of the data of all the rates are sequentially determined with reference to quantities of bytes occupied by fields in a frame structure. Therefore, the byte length of the data of the rate higher than the working rate of the CDR module can be determined, and then a transmission time length of the first data can be determined with reference to the total quantity of bytes of the downlink data frame and the time length of the downlink data frame. In addition, a start time point and an end time point for transmitting the first data can be determined with reference to a time point of the start location of the physical synchronization sequence.

Generally, m-bit information used to represent a byte length may represent a $k^{th}$ byte and a $(k+1)^{th}$ byte, to determine a start location and an end location of the transmission time of the first data.

2. The data of the lowest rate includes the indication information of the data of the N different rates.

Figure 7B:
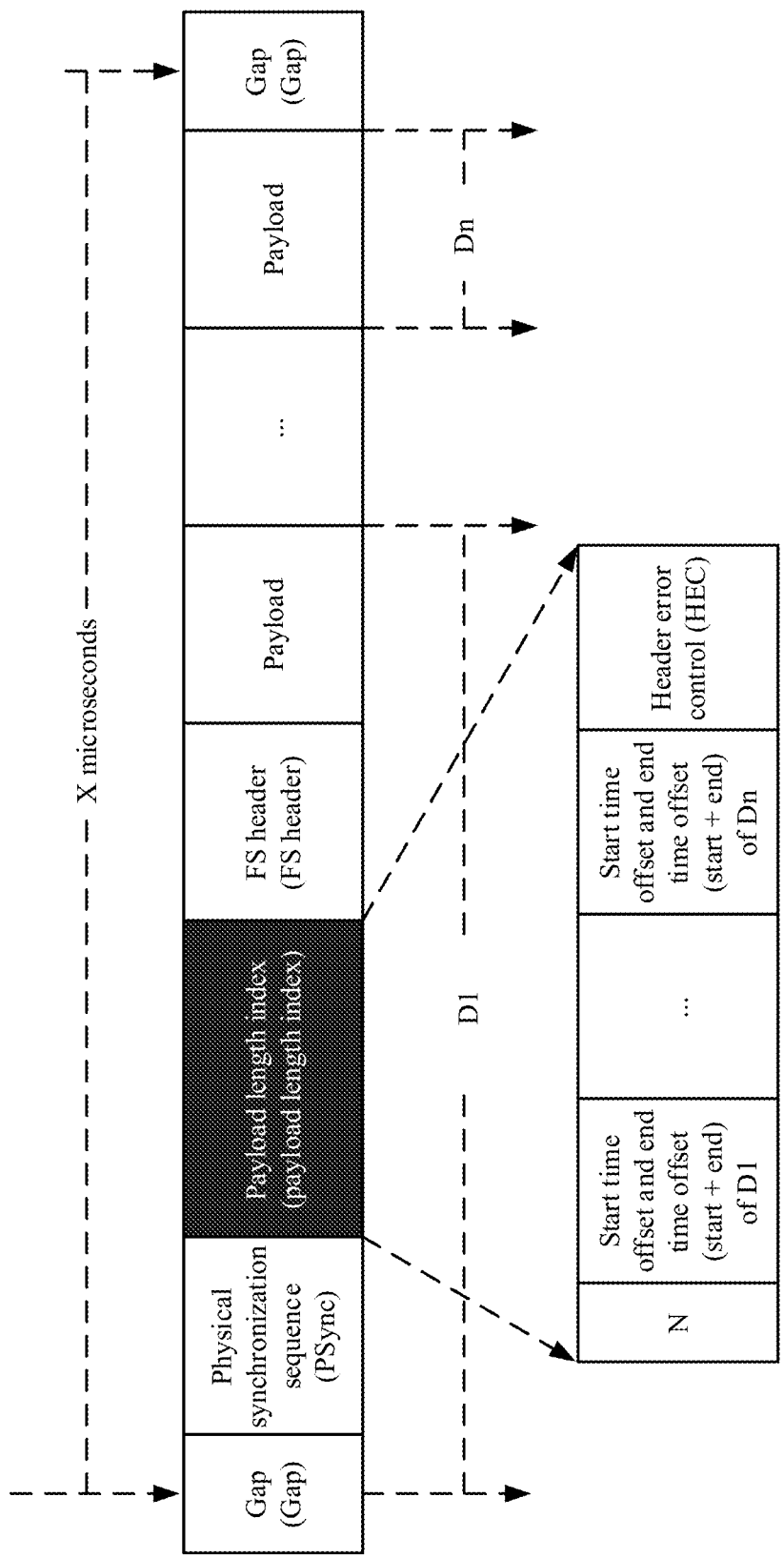
FIG. 7B is another example schematic diagram of indication information in a downlink data frame according to an embodiment of this application.

As shown in FIG. 7B, data D1 of a lowest rate includes the indication information, and the indication information includes a start time offset (start) and an end time offset (end) of the data of each rate relative to a reference point, for example, (start+end) of D1, . . . , and (start+end) of Dn. The reference point is a time point of a start location of a physical synchronization sequence (PSync). An extended field may further include HEC, used for error correction verification.

In this case, the foregoing step of determining the length information of the first data in the data of the N different rates from the data of the lowest rate may include:
  determining a start time offset and an end time offset of the first data from the data of the lowest rate; and
  correspondingly, the generating control information based on the length information of the first data may include:
  determining, based on the time point of the start location of the physical synchronization sequence and the start time offset and the end time offset of the first data, a start time point and an end time point for transmitting the first data.

In this exemplary embodiment, both the start time offset and the end time offset are relative to the reference point. Because a time of the reference point is determined, the start time and the end time for transmitting the first data may be determined by using the start time offset and the end time offset, so that the CDR module is in the specified state within the start time and the end time.

The foregoing describes the PON system and the status control method, and the following describes, with reference to the accompanying drawings, the optical network terminal and the optical line terminal that are provided in embodiments of this application.

Figure 8:
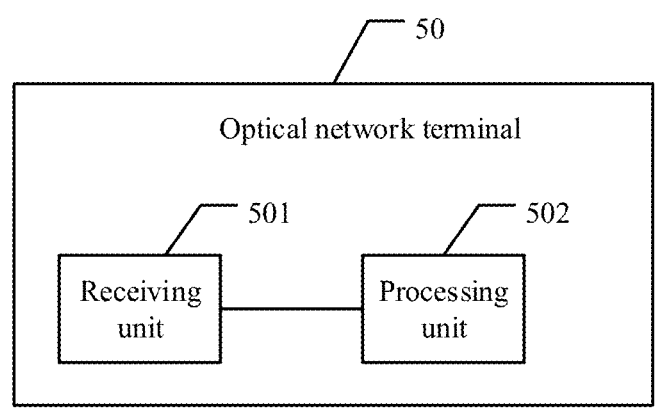
FIG. 8 is a schematic diagram of an embodiment of an optical network terminal according to an embodiment of this application.

As shown in FIG. 8, an embodiment of an optical network terminal 50 provided in embodiments of this application may include:
  a receiving unit 501, configured to receive a first downlink data frame, where the first downlink data frame includes data of N different rates and indication information, the indication information includes arrangement length information of data of each rate in the first downlink data frame, and the length information corresponds to a period of time for transmitting the data of each rate, where N≥2; and
  a processing unit 502, configured to:
  determine length information of first data in the data of the N different rates, where a rate of the first data is higher than a working rate of a clock and data recovery (CDR) module; and
  generate control information based on the length information of the first data, where the control information is used to control the CDR module to be in a specified state within a period of time corresponding to the length information of the first data, and the specified state includes a state of the CDR module at the start of the period of time or a local reference clock of the CDR module.

In a solution provided in this embodiment this application, the CDR module may be controlled to be in the specified state within a period of time in which a rate is higher than the working rate of the CDR module, thereby preventing a clock on an ONU side from being unstable and also preventing an uplink sending clock from being lost.

In an optional embodiment, the data of each rate includes the length information of the data of the rate in the first downlink data frame; and
  the processing unit 502 is configured to determine the length information of the first data in the data of the N different rates from the data of all the rates.

In an optional embodiment, the indication information is carried in data of a lowest rate in the N different rates; and
  the processing unit 502 is configured to determine the length information of the first data in the data of the N different rates from the data of the lowest rate.

In an optional embodiment, the length information in the data of each rate includes information of the data of the rate in the first downlink data frame and a gap byte, where the information is used to indicate a byte length, and the gap byte is used by the CDR module to switch from a current state to the local reference clock within duration of the gap byte; and
  the processing unit 502 is configured to:
  determine, from the data of all the rates, a byte length and a gap byte in data of a rate that is not higher than the working rate of the CDR module;
  determine a byte length and a gap byte of the first data based on the byte length and the gap byte in the data of the rate that is not higher than the working rate of the CDR module and a total byte length of the first downlink data frame; and
  determine, based on an offset of the byte length and an offset of the gap byte of the first data that are relative to a reference point in the total byte length of the first downlink data frame and a time length of the first downlink data frame, the period of time for transmitting the first data, where the reference point is a start location of a physical synchronization sequence.

In an optional embodiment, the indication information includes a start time offset and an end time offset of the data of each rate relative to a reference point, and the reference point is a time point of a start location of a physical synchronization sequence; and the processing unit 502 is configured to:
determine a start time offset and an end time offset of the first data from the data of the lowest rate; and
determine, based on the time point of the start location of the physical synchronization sequence and the start time offset and the end time offset of the first data, a start point time and an end time point for transmitting the first data.

In an optional embodiment, the first downlink data frame and a second downlink data frame are equal in time length and are two adjacent data frames, a time interval between data of a first rate in the first downlink data frame and data of the first rate in the second downlink data frame is equal to the time length of the first downlink data frame, and when N takes different values, the time length of the first downlink data frame remains unchanged.

It should be noted that content such as information exchange between the modules of the optical network terminal 50 and the execution processes thereof is based on a same concept as the method embodiments of this application, and achieves same technical effects as the method embodiments of this application. For specific content, refer to the foregoing descriptions in the method embodiments of this application. Details are not described herein again.

Figure 9:
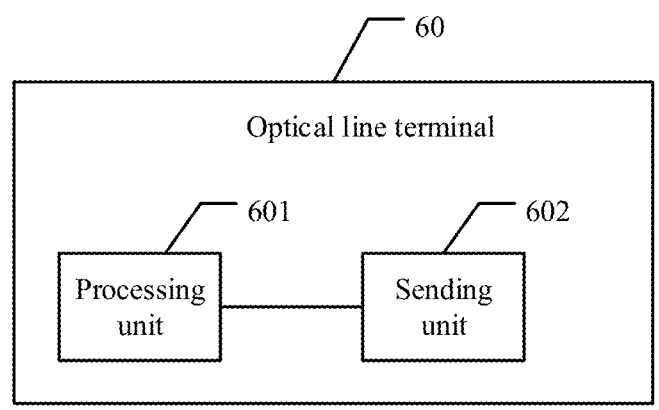
FIG. 9 is a schematic diagram of an embodiment of an optical line terminal according to an embodiment of this application.

Refer to FIG. 9. An embodiment of an optical line terminal 60 provided in embodiments of this application may include:

a processing unit 601, configured to:
obtain to-be-sent data of N different rates, where N≥2; and
configure the data of the N different rates as a first downlink data frame, where the first downlink data frame includes the data of the N different rates and indication information, the indication information includes arrangement length information of data of each rate in the first downlink data frame, and the length information corresponds to a period of time for transmitting the data of each rate; and
a sending unit 602, configured to send the first downlink data frame configured by the processing unit 601.

In this embodiment of this application, the indication information may be configured in the downlink data frame to enable an optical network terminal to generate control information, to control a CDR module to remain in a specified state instead of tracing, within a period of time indicated by the control information, first data of a rate higher than a working rate of the CDR module. In this way, a clock on an ONU or ONT side can be prevented from being unstable, and an uplink transmit clock on the ONU or ONT side can also be prevented from being lost.

In an optional embodiment, the data of each rate includes the length information of the data of the rate in the first downlink data frame.

In an optional embodiment, the indication information is carried in data of a lowest rate in the N different rates.

In an optional embodiment, the length information in the data of each rate includes information of the data of the rate in the first downlink data frame and a gap byte, where the information is used to indicate a byte length, and the gap byte is used by the CDR module to switch from a current state to a local reference clock within duration of the gap byte.

In an optional embodiment, the indication information includes a start time offset and an end time offset of the data of each rate relative to a reference point, and the reference point is a time point of a start location of a physical synchronization sequence.

In an optional embodiment, the first downlink data frame and a second downlink data frame are equal in time length and are two adjacent data frames, a time interval between data of a first rate in the first downlink data frame and data of the first rate in the second downlink data frame is equal to a time length of the first downlink data frame, and when N takes different values, the time length of the first downlink data frame remains unchanged.

Figure 10:
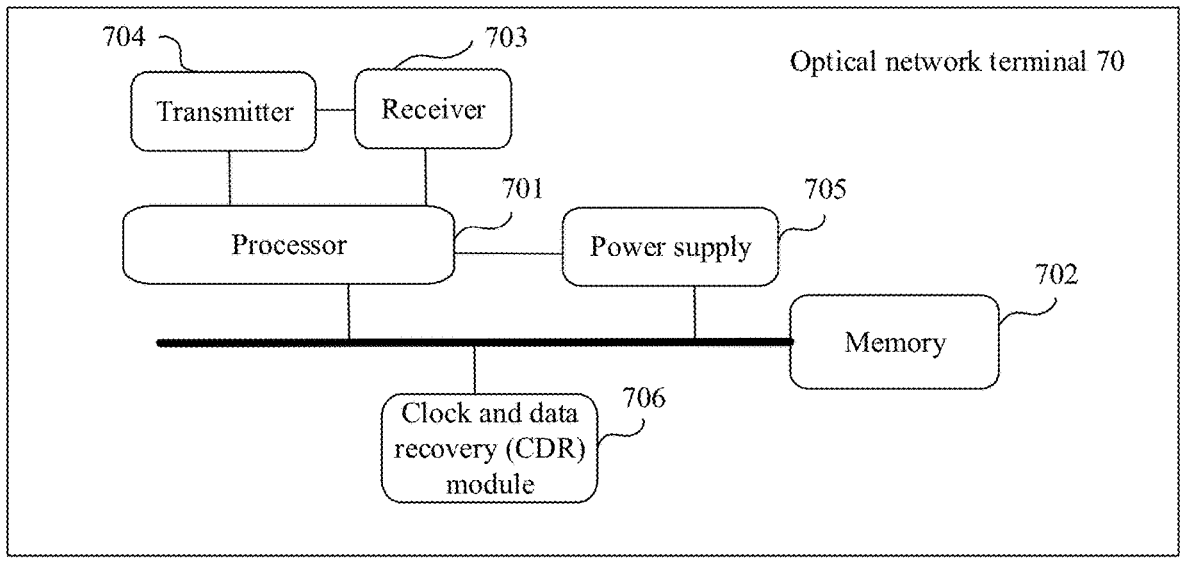
FIG. 10 is a schematic diagram of another embodiment of an optical network terminal according to an embodiment of this application.

FIG. 10 is a schematic diagram depicting a structure of another device according to an embodiment of this application. The device is an optical network terminal 70. The optical network terminal 70 may include a processor (for example, a CPU) 701, a memory 702, a transmitter 704, and a receiver 703. The transmitter 704 and the receiver 703 are coupled to the processor 701. The processor 701 controls a sending action of the transmitter 704 and a receiving action of the receiver 703. The receiver 703 may be referred to as a receiver, and the transmitter 704 may be referred to as a transmitter. The memory 702 may include a high-speed RAM, or may further include a nonvolatile memory (NVM), for example, at least one magnetic disk memory. The memory 702 may store various instructions, to complete various processing functions and implement the steps of a method in embodiments of this application. Optionally, the optical network terminal 70 in this embodiment of this application may further include one or more of a power supply 705 and a CDR module 706. The components described in FIG. 10 may be connected through a communications bus, or may be connected in another connection manner. This is not limited in this embodiment of this application. The receiver 703 and the transmitter 704 may be integrated into a transceiver of the optical network terminal 70, or may be respectively independent receive and transmit antennas in the optical network terminal 70. The communications bus is configured to implement communication connections between components.

In some embodiments, the processor 701 in the optical network terminal 70 may perform the action performed by the processing unit 502 in FIG. 8, and the receiver 703 in the optical network terminal 70 may perform the action performed by the receiving unit 501 in FIG. 8. An implementation principle and technical effects in this embodiment are similar to those of the method embodiment, and details are not described herein again.

This application further provides a chip system. The chip system includes a processor, configured to support the optical network terminal 70 to implement a function related to the optical network terminal 70, for example, receiving or processing data in the foregoing method embodiments. In an exemplary embodiment, the chip system further includes a memory. The memory is configured to store program instructions and data for the optical network terminal 70. The chip system may include a chip, or may include a chip and another discrete component.

Figure 11:
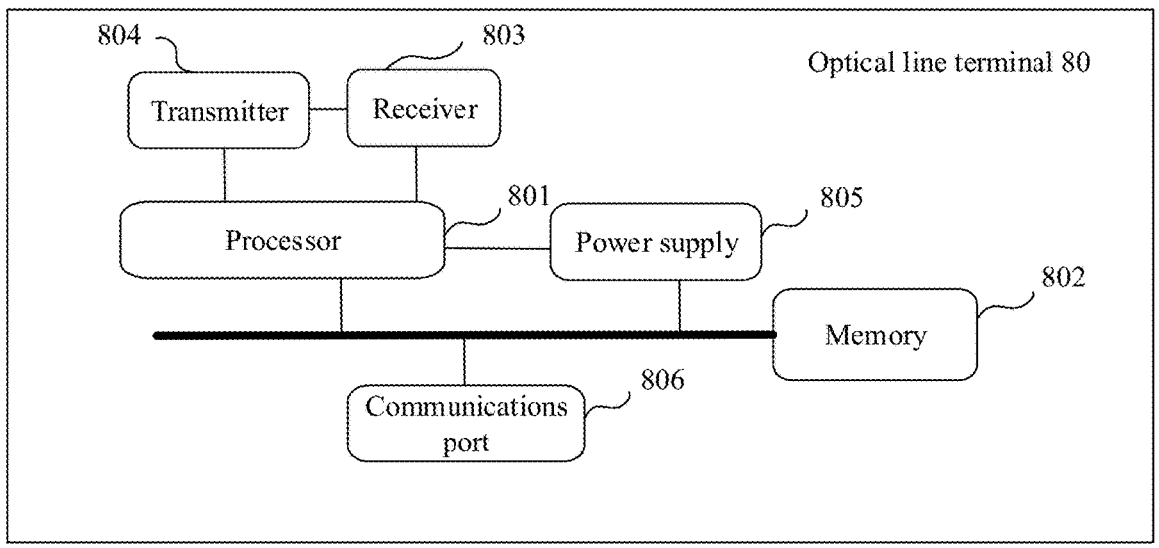
FIG. 11 is a schematic diagram of another embodiment of an optical line terminal according to an embodiment of this application.

FIG. 11 is a schematic diagram depicting a structure of still another device according to an embodiment of this application. The device is an optical line terminal 80. The optical line terminal 80 may include a processor (for example, a CPU) 801, a memory 802, a transmitter 804, and a receiver 803. The transmitter 804 and the receiver 803 are coupled to the processor 801. The processor 801 controls a sending action of the transmitter 804 and a receiving action of the receiver 803. The receiver 803 may be referred to as a receiver, and the transmitter 804 may be referred to as a transmitter. The memory 802 may include a high-speed RAM, or may further include a nonvolatile memory (NVM), for example, at least one magnetic disk memory. The memory 802 may store various instructions, to complete various processing functions and implement the steps of a method in embodiments of this application. Optionally, the optical line terminal 80 in this embodiment of this application may further include one or more of a power supply 805 and a communications port 806. The components described in FIG. 11 may be connected through a communications bus, or may be connected in another connection manner. This is not limited in this embodiment of this application. The receiver 803 and the transmitter 804 may be integrated into a transceiver of the optical line terminal 80, or may be respectively independent receive and transmit antennas in the optical line terminal 80. The communications bus is configured to implement communication connections between components. The communications port 806 is configured to implement connection and communication between the optical line terminal 80 and another external device.

In some embodiments, the processor 801 in the optical line terminal 80 may perform the action performed by the processing unit 601 in FIG. 9, and the receiver 804 in the optical line terminal 80 may perform the action performed by the sending unit 602 in FIG. 9. An implementation principle and technical effects in this embodiment are similar to those of the method embodiment, and details are not described herein again.

This application further provides a chip system. The chip system includes a processor, configured to support the optical line terminal 80 to implement a function related to the optical line terminal 80, for example, receiving or processing data in the foregoing method embodiments. In an exemplary embodiment, the chip system further includes a memory. The memory is configured to store program instructions and data for the optical line terminal 80. The chip system may include a chip, or may include a chip and another discrete component.

In another embodiment of this application, a computer-readable storage medium is further provided. The computer-readable storage medium stores computer-executable instructions. When at least one processor of a device executes the computer-executable instructions, the device performs a method performed by an optical network terminal or an optical line terminal in the embodiments shown in FIG. 4 to FIG. 7B.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium. When the at least one processor executes the computer-executable instructions, the device performs the method performed by the optical network terminal or the optical line terminal in these embodiments shown in FIG. 4 to FIG. 7B.

A person of ordinary skill in the art may be aware that units and algorithm steps in the examples described with reference to embodiments disclosed in this specification can be implemented by electronic hardware or a combination of computer software and electronic hardware. Whether the functions are performed by hardware or software depends on particular applications and design constraints of respective technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of a foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, function units in embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, or a network device) to perform all or some of the steps of methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in this application may fall within the protection scope of this application.

What is claimed is:

1. A status control method, comprising:
receiving, by an optical network terminal, a first downlink data frame, wherein the first downlink data frame comprises data of N different rates and indication information, wherein the indication information comprises length information of data of each respective rate in the first downlink data frame, wherein respective length information for data of a respective rate corresponds to a period of time for transmitting the data of the respective rate, and wherein N≥2;

determining, by the optical network terminal, length information of first data in the data of the N different rates, wherein a rate of the first data is higher than a working rate of a clock and data recovery (CDR) module; and generating, by the optical network terminal, control information based on the length information of the first data, wherein the control information is for controlling the CDR module to be in a specified state within a period of time corresponding to the length information of the first data, wherein the specified state comprises a state of the CDR module at the start of the period of time or a local reference clock of the CDR module.

2. The method according to claim 1, wherein the data of each respective rate comprises the length information of the data of the respective rate in the first downlink data frame; and wherein the length information of the first data in the data of the N different rates is determined from the data of the N different rates.

3. The method according to claim 2, wherein the length information in the data of a respective rate comprises information of the data of the respective rate in the first downlink data frame and a gap byte, wherein the information indicates a byte length, and the gap byte is usable by the CDR module to switch from a current state to the local reference clock within a duration of the gap byte;

wherein determining the length information of the first data comprises:

determining, from the data of the N different rates, a byte length and a gap byte in data of a rate that is not higher than the working rate of the CDR module; and determining a byte length and a gap byte of the first data based on the byte length and the gap byte in the data of the rate that is not higher than the working rate of the CDR module and a total byte length of the first downlink data frame; and wherein generating the control information based on the length information of the first data comprises: determining, based on an offset of the byte length and an offset of the gap byte of the first data that are relative to a reference point in the total byte length of the first downlink data frame and a time length of the first downlink data frame, the period of time for transmitting the first data, wherein the reference point is a start location of a physical synchronization sequence.

4. The method according to claim 2, wherein the first downlink data frame and a second downlink data frame are equal in time length and are two adjacent data frames, wherein a time interval between data of a first rate in the first downlink data frame and data of the first rate in the second downlink data frame is equal to the time length of the first downlink data frame, and wherein the time length of the first downlink data frame is unchanged for different values of N.

5. The method according to claim 1, wherein the indication information is carried in data of a lowest rate in the N different rates; and wherein the length information of the first data in the data of the N different rates is determined from the data of the lowest rate.

6. The method according to claim 5, wherein the indication information comprises a start time offset and an end time offset of the data of each respective rate relative to a reference point, wherein the reference point is a time point of a start location of a physical synchronization sequence;

wherein determining the length information of the first data comprises: determining a start time offset and an end time offset of the first data from the data of the lowest rate; and wherein generating the control information based on the length information of the first data comprises: determining, based on the time point of the start location of the physical synchronization sequence and the start time offset and the end time offset of the first data, a start time point and an end time point for transmitting the first data.

7. A data sending method, comprising:

obtaining, by an optical line terminal (OLT), to-be-sent data of N different rates, wherein N≥2;

configuring, by the OLT, the to-be-sent data of the N different rates as a first downlink data frame, wherein the first downlink data frame comprises the to-be-sent data of the N different rates and indication information, wherein the indication information comprises length information of data of each respective rate in the first downlink data frame, and wherein respective length information for data of a respective rate corresponds to a period of time for transmitting the data of the respective rate; and sending, by the OLT, the first downlink data frame.

8. An optical network terminal, comprising:

a transceiver;

a clock and data recovery (CDR) module; and a processor;

wherein the transceiver is configured to receive a first downlink data frame, wherein the first downlink data frame comprises data of N different rates and indication information, wherein the indication information comprises length information of data of each respective rate in the first downlink data frame, wherein respective length information for data of a respective rate corresponds to a period of time for transmitting the data of the respective rate, and wherein N≥2;

wherein the processor is configured to: determine length information of first data in the data of the N different rates, wherein a rate of the first data is higher than a working rate of the clock and data recovery (CDR) module; and generate control information based on the length information of the first data; and wherein the CDR module is configured, based on the control information, to be in a specified state within a period of time corresponding to the length information of the first data, wherein the specified state comprises a state of the CDR module at the start of the period of time or a local reference clock of the CDR module.

9. The optical network terminal according to claim 8, wherein the data of each respective rate comprises the length information of the data of the respective rate in the first downlink data frame; and wherein the length information of the first data in the data of the N different rates is determined from the data of the N different rates.

10. The optical network terminal according to claim 9, wherein the length information in the data of each respective rate comprises information of the data of the respective rate in the first downlink data frame and a gap byte, where the information indicates a byte length, and the gap byte is usable by the CDR module to switch from a current state to the local reference clock within duration of the gap byte; and wherein the processor is further configured to:

determine, from the data of the N different rates, a byte length and a gap byte in data of a rate that is not higher than the working rate of the CDR module;

determine a byte length and a gap byte of the first data based on the byte length and the gap byte in the data of the rate that is not higher than the working rate of the CDR module and a total byte length of the first downlink data frame; and determine, based on an offset of the byte length and an offset of the gap byte of the first data that are relative to a reference point in the total byte length of the first downlink data frame and a time length of the first downlink data frame, the period of time for transmitting the first data, wherein the reference point is a start location of a physical synchronization sequence.

11. The optical network terminal according to claim 8, wherein the indication information is carried in data of a lowest rate in the N different rates; and wherein the length information of the first data in the data of the N different rates is determined from the data of the lowest rate.

12. The optical network terminal according to claim 11, wherein the indication information comprises a start time offset and an end time offset of the data of each rate relative to a reference point, wherein the reference point is a time point of a start location of a physical synchronization sequence; and wherein the processor is further configured to:

determine a start time offset and an end time offset of the first data from the data of the lowest rate; and determine, based on the time point of the start location of the physical synchronization sequence and the start time offset and the end time offset of the first data, a start time point and an end time point for transmitting the first data.

* * * * *